(12) United States Patent
Pierson et al.

(10) Patent No.: US 8,807,329 B2
(45) Date of Patent: Aug. 19, 2014

(54) CHAIN DRIVE SYSTEM FOR BI-PARTING SLATTED FLOOR

(71) Applicant: Top Tier, Inc., Clackamas, OR (US)

(72) Inventors: Cary Michael Pierson, Milwaukie, OR (US); Stephen L. Heston, West Linn, OR (US)

(73) Assignee: Top Tier, Inc., Clackamas, OR (US)

( * ) Notice: Subject to any disclaimer, the term of this patent is extended or adjusted under 35 U.S.C. 154(b) by 90 days.

(21) Appl. No.: 13/661,108

(22) Filed: Oct. 26, 2012

(65) Prior Publication Data

US 2013/0104460 A1    May 2, 2013

Related U.S. Application Data

(60) Provisional application No. 61/553,158, filed on Oct. 29, 2011.

(51) Int. Cl.
*B65G 19/18*    (2006.01)
*B65G 57/06*    (2006.01)

(52) U.S. Cl.
CPC .................................... *B65G 57/06* (2013.01)
USPC .................. 198/735.4; 198/369.7; 198/735.5; 198/817

(58) Field of Classification Search
USPC .......... 198/369.7, 465.3, 735.4, 735.5, 750.1, 198/750.2, 817, 833, 860.3, 860.5
See application file for complete search history.

*Primary Examiner* — Ramya Burgess
*Assistant Examiner* — Lester Rushin
(74) *Attorney, Agent, or Firm* — Hancock Hughey LLP (57) ABSTRACT

A chain drive system for a bi-parting slatted floor in a drive system relies upon two continuous loops of chain, one on each side of the slatted floor that move in opposite directions beneath the slats are arranged side-by-side in the same horizontal plane, at the same level. A single drive motor drives both loops of chain. With the operative portions of the chain sections between drive and idler shafts arranged side-by-side in the same horizontal plane, the vertical amount of space occupied by the chains is significantly decreased compared to the vertically stacked chains of the prior art. This allows the underlying surface onto which items are deposited to be moved vertically upward next to the lower surface of the slatted floor.

20 Claims, 8 Drawing Sheets

CHAIN DRIVE SYSTEM FOR BI-PARTING SLATTED FLOOR

TECHNICAL FIELD

The present invention relates to a drive system for moving a slatted floor of the type utilized in palletizing equipment and the like, and more specifically to a chain drive system for a bi-parting slatted floor.

BACKGROUND

Slatted floors are used in a variety of equipment such as automated palletizing systems. When used in a palletizing system, the slatted floor defines a temporary surface onto which items that are being palletized are arranged. When the items are ready to be transferred onto another surface such as a pallet or a slip sheet, the slatted floor is moved horizontally from beneath the items so that the items are deposited onto an underlying surface.

A bi-parting slatted floor is defined by plural slats that define a unitary surface when the floor is in a closed position. When the floor is "opened", the unitary surface splits along a mid-line and one section of the floor moves horizontally in a first direction and the other section of the floor moves horizontally in the opposite direction. The items collected on the slatted floor when it was closed are thus deposited onto the underlying surface when the bi-parting floor opens. In most instances, the underlying surface onto which the items are deposited is vertically movable so that the underlying surface is maintained in proximity to the lower surface of the slatted floor. Therefore, as the bi-parting floor opens the items that are being transferred to the underlying surface, for example, a pallet, are dropped as the slatted floor sections withdraw from beneath the items—it is desirable to minimize the distance that the items are dropped in order to minimize damage to the items and their contents.

Bi-parting slatted floors (and other slatted floors) are typically driven by chain drive systems that are driven by motors. Since in a bi-parting system the two portions of the floor that move necessarily move simultaneously in opposite directions, the chain system necessarily must move in opposite directions. This necessitates two sections of chain positioned adjacent the floor—typically beneath the slats. Previously, the two sections of chain have been vertically stacked relative to one another—that is, one chain is located vertically atop the other. Both chains are attached to the appropriate portions of the overlying slats with extension arms that extend from the chain links to the lower surface of the slats. The extension arms that are attached to the vertically lowermost section of chain and extend upwardly to the lower surface of the slats are necessarily relatively longer than the extension arms that are attached to the uppermost section of chain and extend upwardly to the lower surface of the slats; often there is a strong bending moment applied to the extension arms as the drive system starts up.

The vertically stacked sections of chain in prior chain drive systems for bi-parting slatted floors are therefore prone to a variety of problems, the first being damage caused to the chains and extension arms that interconnect the chains to the floor slats. When the drive motors start up, the bending moment on the extension arms can be very strong and this can result in the arms being bent. A second problem is that the vertically stacked sections of chain prevent the underlying surface—the pallet—from being moved into very close proximity to the bottom of the slatted floor. In other words, the upper surface of the pallet (or the upper surface of a layer of items already stacked on a pallet) can only be moved upwardly toward the lower surface of the slatted floor until the pallet's upper surface is adjacent the vertically stacked chains. Since the chains and associated hardware can be relatively heavy duty and robust, items accumulated on the slatted floor may have to "drop" several inches onto the pallet when the slatted floor is opened. This drop may cause damage to the items on the slatted floor, for example, boxes, or their contents.

There is a need therefore for a drive system for a bi-parting slatted floor that alleviates the problems caused by known stacked-chain systems, and to eliminate the damage caused by dropping items from the slatted floor onto the underlying surface.

The present invention comprises a chain drive system for a bi-parting slatted floor in which the vertically stacked drive chains of the prior art systems are replaced by a drive system that relies upon two continuous loops of chain, one on each side of the slatted floor that move in opposite directions beneath the slats. Operative sections of a single chain between driven and idler shafts are arranged side-by-side in the same horizontal plane, at the same level. A single drive motor drives both loops of chain. The side-by-side orientation of the operable portions of the chain eliminates the long extension arms necessary to attach the chain links to the lower surface of the slats, and allows for substantial improved vertical movement of the underlying surface. In other words, with the operative portions of the chain sections arranged side-by-side in the same horizontal plane, the vertical amount of space occupied by the chains is significantly decreased compared to the vertically stacked chains of the prior art. This allows the underlying surface onto which items are deposited to be moved vertically upward next to the lower surface of the slats to a significantly greater extent. The additional vertical movement of the underlying surface provides for substantial operational benefits and eliminates the significant vertical drop distance associated with vertically stacked chain systems.

BRIEF DESCRIPTION OF THE DRAWINGS

The invention will be better understood and its numerous objects and advantages will be apparent by reference to the following detailed description of the invention when taken in conjunction with the following drawings.

In FIG. 1 the slat floor is in the closed position.

DETAILED DESCRIPTION OF ILLUSTRATED EMBODIMENTS

The invention will now be described in detail with reference to the drawings. It will be understood that relative directional terms are used at times to describe parts of the invention and relative positions of the parts. As a naming convention, the ground plane is considered to be the generally horizontal surface on which the apparatus of the present invention is mounted. In all conventional installations, the apparatus is installed on a horizontal floor and the upper surface of the slatted floor described herein is also horizontal when the slatted floor is in the closed position. Other relative directional terms correspond to this convention: "upper" refers to the direction above and away from the ground plane; "lower" is generally in the opposite direction, "inward" is the direction from the exterior toward the interior of the apparatus, "vertical" is the direction normal to the horizontal ground plane, and so on.

Furthermore, in all figures used herein the underlying surface or floor onto which items accumulated on the upper surface of the slat floor are deposited is omitted, as are the other structures used in associated machinery, such as a palletizing system. Also omitted from the drawings is most of the framing and other support structures—such environmental components are well known to those of skill in the art.

It will be appreciated that the drive system and bi-parting slatted floor described herein is designed to be used in combination with automatic palletizing systems. Described generally, items such as boxes are accumulated onto the upper surface of the closed bi-parting slatted floor with a palletizing system such as a pick and place robot or other system. A receiving layer such as a pallet or slip sheet is oriented directly beneath the slatted floor and is raised upwardly by the palletizing system until the upper surface of the receiving layer, which could be the pallet or the upper layer of items deposited onto the pallet, is in close proximity to the lower surface of the closed slatted floor. When a complete layer of items is accumulated on the closed slatted floor, the bi-parting floor is opened such that the two floor halves move in opposite directions with the floor dividing at a mid-line. As the slatted floor is opened, items on the floor "drop" onto the receiving floor. The receiving floor is then lowered and the bi-parting slatted floor is closed so that this general process may be repeated until the pallet is fully loaded.

Figure 4:
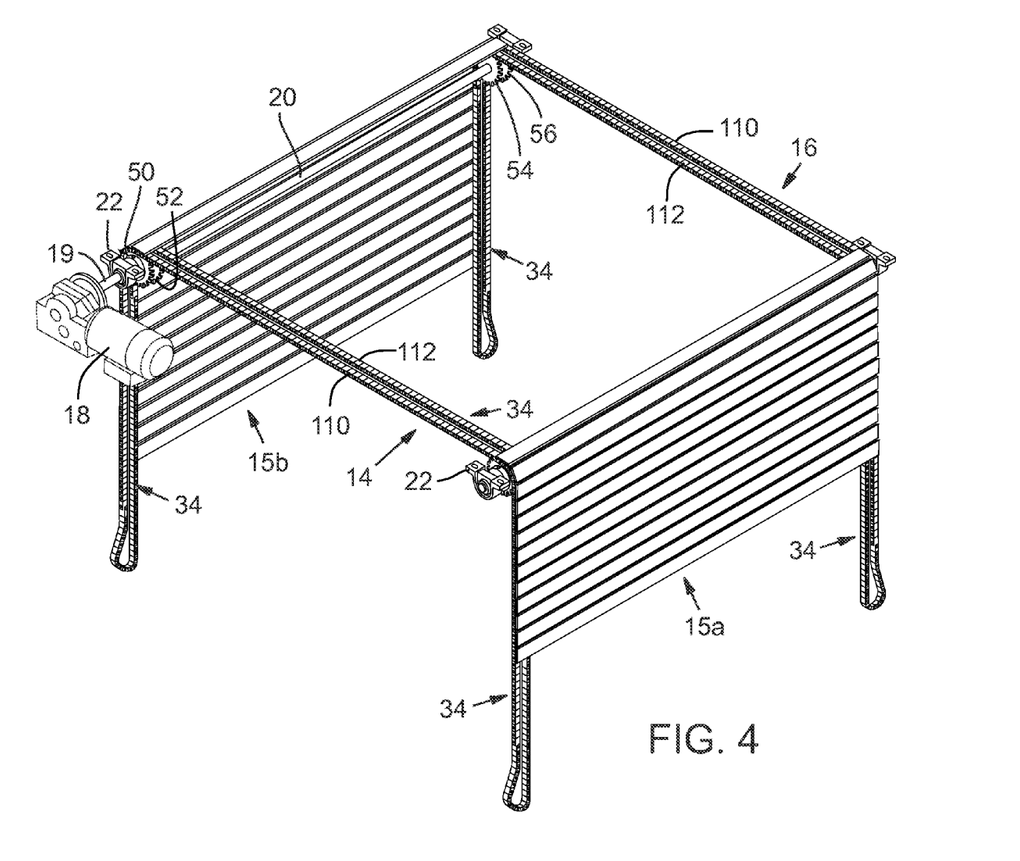
FIG. 4 is an upper perspective view of the upper surface of a bi-parting slat floor using a chain drive system according to the present invention similar to FIG. 1 except the slatted floor is in the open position position.

It is to be appreciated, therefore, that with respect to all figures used herein and as exemplified by FIG. 4, in an operating environment, when the slatted floor is in the open position the underlying surface onto which items such as boxes are deposited (which again is not shown), will have been moved vertically upward adjacent to the lower surface of the slated floor so that items on the slatted floor will be deposited on the underlying surface with minimal vertically distance dropped as the items are transferred from the slat to the underlying floor. As noted, the underlying surface is typically a pallet or a slip sheet.

Figure 1:
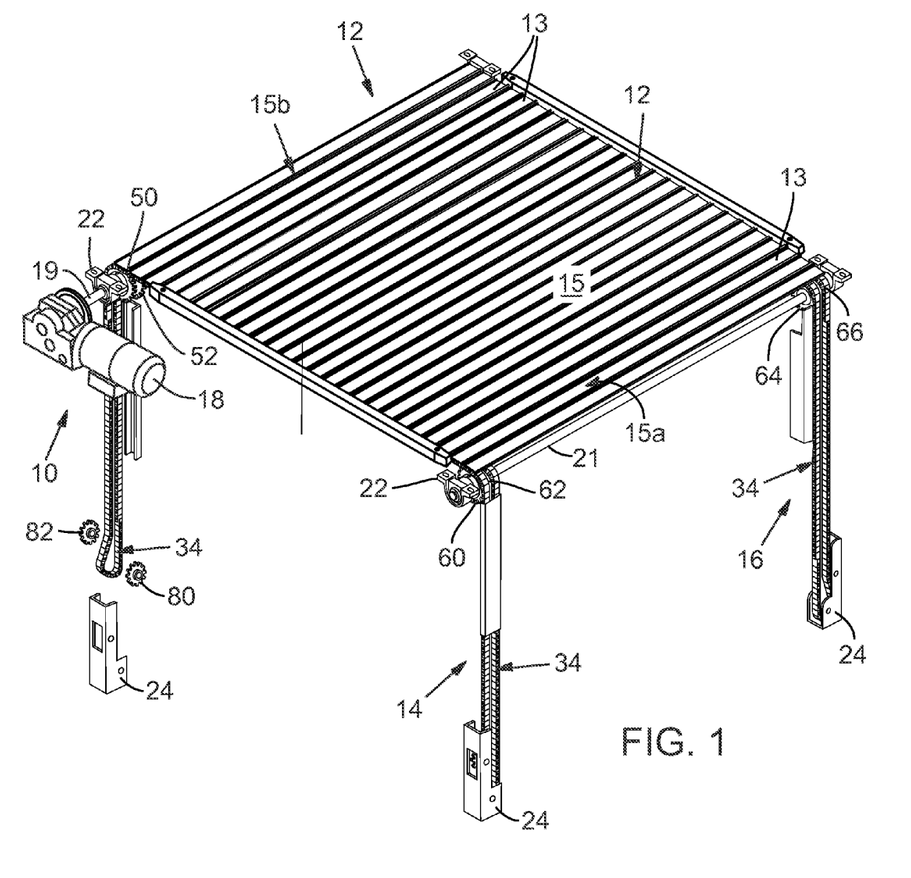
FIG. 1 is an upper perspective view of the upper surface of a bi-parting slat or slatted floor using a chain drive system according to the present invention.

Turning now to FIG. 1, a chain drive system 10 for a bi-parting slatted floor (shown generally at 12) is illustrated; in FIG. 1 the slatted floor 12 is in the closed position. The slatted floor 12 is defined by multiple individual slats 13. In the closed position the slatted floor defines an upper surface 15 that comprises two separate floor sections, a first section 15a and a second section 15b. The two floor sections 15a and 15b are driven in opposite directions by the chain drive system described herein so that the slatted floor 12 may be selectively moved between the closed position of FIG. 1, and the open position shown in FIG. 4. The "lower" surface of the slatted floor 12 is referenced with the number 17.

When slatted floor 12 is in the closed position of FIG. 1, the floor is a unitary surface onto which items such as boxes may be accumulated. When the floor is in the open position as shown for example in FIG. 4, the slated floor is completely open and both sections of the bi-parting floor 15a and 15b have been moved such that they are in vertical position. As the floor sections are withdrawn from the closed position toward the open position, items accumulated on the closed floor are deposited onto the underlying surface (again, not shown).

The chain drive apparatus 10 comprises a first side chain path 14 and a second side chain path 16 and each of the first and second side chain paths have associated structures as described below. A drive motor 18 is mounted in proximity to chain drive apparatus 10, for instance, on a frame structure (not shown) and includes a drive shaft 19 that connects directly to a driven shaft 20 (FIG. 4). As drive shaft 19 rotates, driven shaft 20 also rotates. An idler shaft 21 is positioned at the opposite side of the apparatus 10. While the idler shaft 21 is not directly driven by motor 18, it is driven simultaneously by virtue of the chains that define the first and second chain paths 14 and 16, as detailed below.

Each of the driven shaft 20 and the idler shaft 21 is mounted to appropriate support structures associated with the apparatus, for example, with shaft support bearing blocks 22. Moreover, the driven shaft 20 and the idler shaft 21 have 4 sprockets mounted on the shafts for engaging the chains. Specifically, as best shown in FIGS. 1 and 4, driven shaft 20 has a first drive sprocket 50 mounted on the proximate end of the shaft (relative to the drive motor 18) and immediately adjacent and inward relative to first drive sprocket 50 (on the shaft 20) is a first idler sprocket 52. At the opposite end of driven shaft 20—the distal end of the shaft—a second drive sprocket 56 is mounted outwardly of and immediately adjacent to a second idler sprocket 54. The drive sprockets 50 and 56 are fixed to driven shaft 20 so that as the shaft rotates (by operation of motor 18), the drive sprockets rotate. The idler sprockets 52 and 54 are rotatable on the driven shaft 20 independently of the rotation of the shaft.

The idler shaft 21 has a similar arrangement of 4 sprockets, but each of the 4 is defined by an idler sprocket that is not keyed to the idler shaft. With continuing reference to FIGS. 1 and 4, two idler sprockets 60 and 66 are mounted on opposite ends of the idler shaft 21 and immediately inwardly of and adjacent to the two idler sprockets 60 and 66 are idler sprockets 62 and 64. As with idler sprockets 52 and 54 the idler 60, 62, 64 and 66 rotate on the idler shaft 21 independently of the rotation of the shaft.

There are numerous structural variations that are equivalent to the driven and idler shafts and sprockets described above that those of skill in the art will understand to accomplish the same functionality. For example, the driven shaft and the idler shaft described above, and the sprockets mounted on the shafts, may be replaced with other structures that accomplish the same functionality. Further, the idler sprockets on the driven shaft, 52 and 54, may be mounted on brackets that are in turn attached to framing structures. Similarly, sprockets 60, 62, 64 and 66 on the idler shaft 21 may be mounted on brackets or other similar structures rather than on a shaft such as idler shaft 21. As other alternatives, the idler sprockets may all be replaced with fixed plastic or nylon pylons that guide the chain around the transition from horizontal to vertical, and the relative sizes of the sprockets may be varied.

Figures 2, 3, 3A:
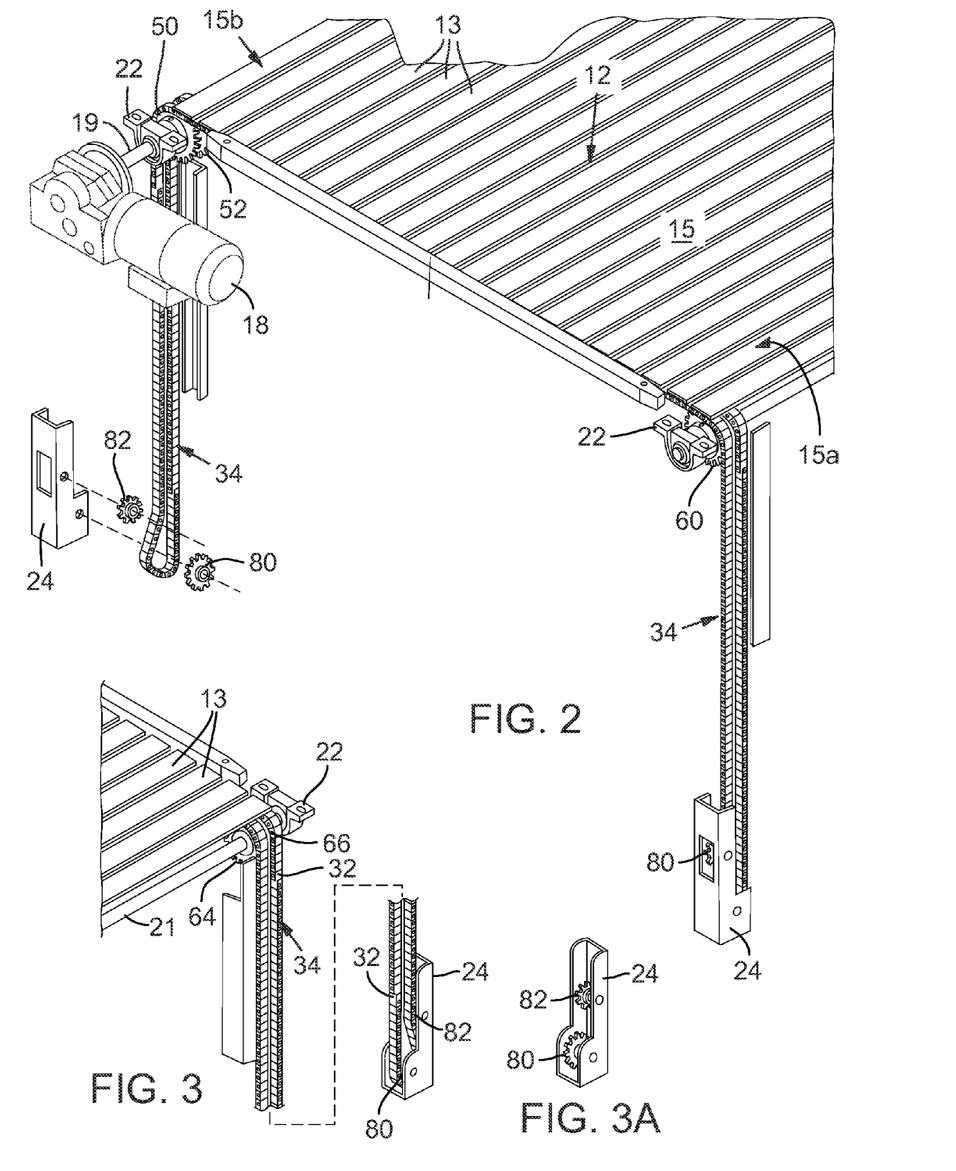
FIG. 2 is an upper perspective view similar to FIG. 1 but showing the structures such as the chain drive in relative greater detail and in a partially exploded view.
FIG. 3 is us an upper perspective view showing an upper corner of the slatted floor according to the present invention, detailing an idler support block and associated structures.
FIG. 3A is a perspective view of an idler support block without the chain engaged thereon in order to illustrate the deflecting idler sprocket and the bottom idler sprocket.

As seen in FIGS. 1, 2 and 4, the drive sprocket 50 is aligned with idler sprocket 60; the two idler sprockets 52 and 62 are aligned; idler sprockets 54 and 64 are aligned and drive sprocket 56 is aligned with idler sprocket 66. These alignments allow the chain to run in a single, continuous loop that defines each of the first and second chain paths 14 and 16.

Figures 6, 10:
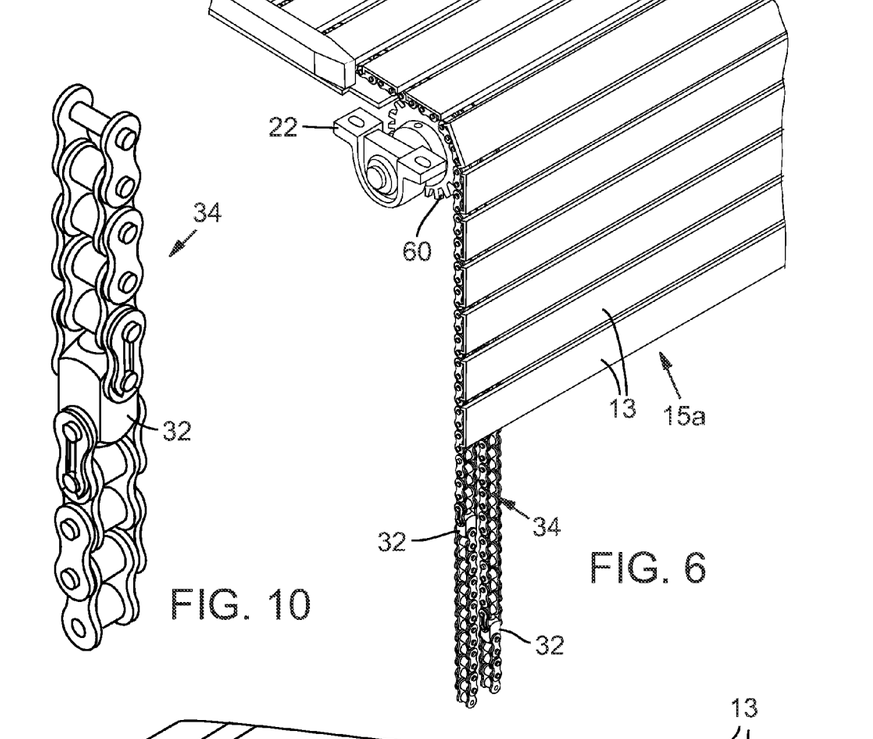
FIG. 6 is an upper perspective view of a corner portion of the apparatus according to the present invention in which the frame support structures are removed and one side of the bi-part slat floor is illustrated in a partially open position in which the slat floor has transitioned over the end roll from the horizontal floor position to the vertical position.
FIG. 10 is a perspective view showing a section of chain and illustrating one 90 degree chain coupler that interconnects chain ends and results in the respective lengths of chains being oriented at 90 degree angles relative to one another.

Each of the first and second chain paths 14 and 16 is defined by a single continuous length of chain 34. Turning to FIG. 10, each of the chains 34 incorporates plural 90 degree chain couplers 32. The 90 degree chain couplers interconnect opposite ends of lengths of chain 34 so that the orientation of chain 34 on one side of the 90 degree chain couplers is 90 degrees rotated relative to the orientation of the chain 34 on the opposite side of the 90 degree chain couplers. As detailed below, the chains 34 includes both follower links 38 and coupler links 36—the two different types of links 38 and 36 are best shown in isolation in FIG. 15. As detailed below, the coupler links 36 include arms 40 that interconnect the coupler links 36 to individual slats 13 on the lower surface 17 of slatted floor 12 so that movement of the chains 34 causes movement of the slatted floor.

Figures 11, 13:
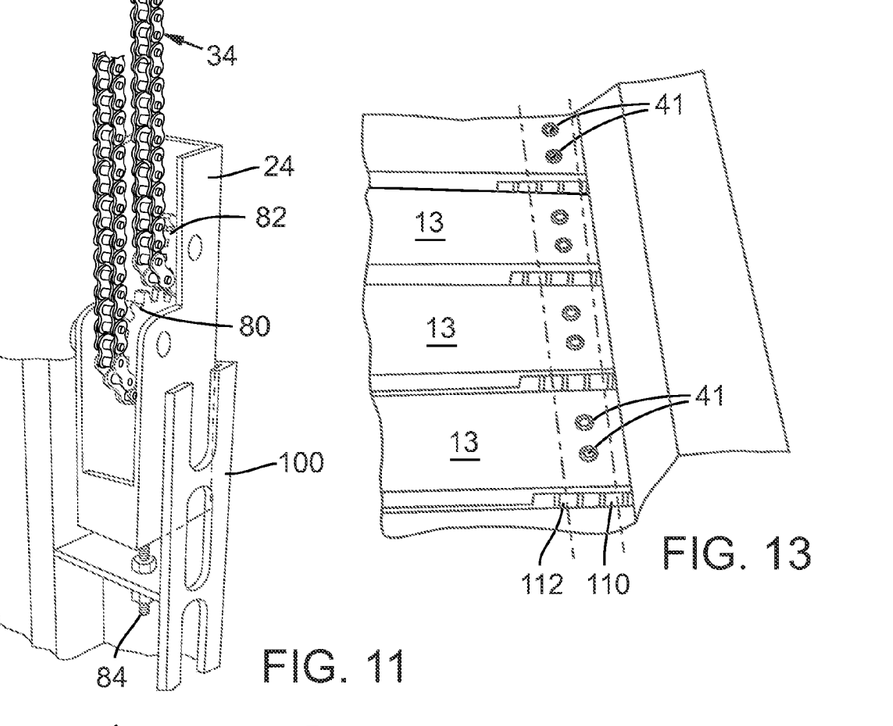
FIG. 11 is a perspective view of a bottom idler block and take-up screw; the bottom idler block is at the lower end of the loop in each chain path.
FIG. 13 is a perspective view of the upper surface of the slatted floor illustrating the attachment of the chains to the slats from the upper side of the slatted floor.
Figure 12:
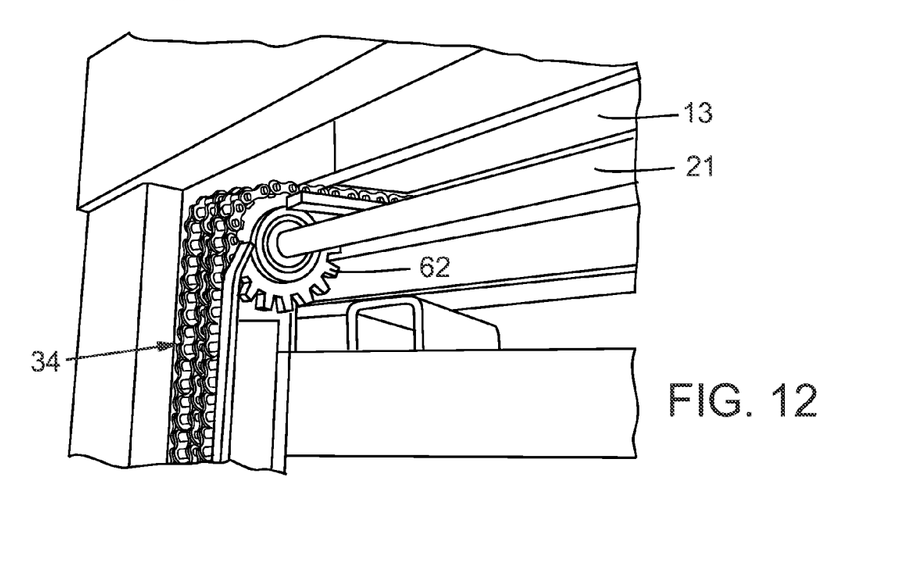
FIG. 12 is a perspective view of the sprockets for each of the side-by-side chains—the sprockets are attached to a driven shaft.

Returning to FIG. 1, each of the two chain paths 14 and 16 includes a pair of bottom idler blocks 24, one bottom idler block located at each of the two lower ends of the loop of chain that defines a chain path. The bottom idler blocks are mounted to frame or other support structures 100 as shown in FIG. 11 and include a bottom idler sprocket 80 and an adjacent bottom deflecting idler sprocket 82. One primary function of the bottom idler blocks 24 is to deflect and maintain chain spacing. Specifically, as best illustrated in FIG. 11, the bottom deflecting idler sprocket 82 deflects the chain path from the pitch diameter of the associated idler sprocket on the associated drive shaft 20 or idler shaft 21, and the bottom idler sprocket 80 the aligns the spacing on the chain with the sprockets on the drive shaft or idler shaft, as the case may be. A take up screw 84 allows for adjusting the tension on the chain 34.

Figure 8:
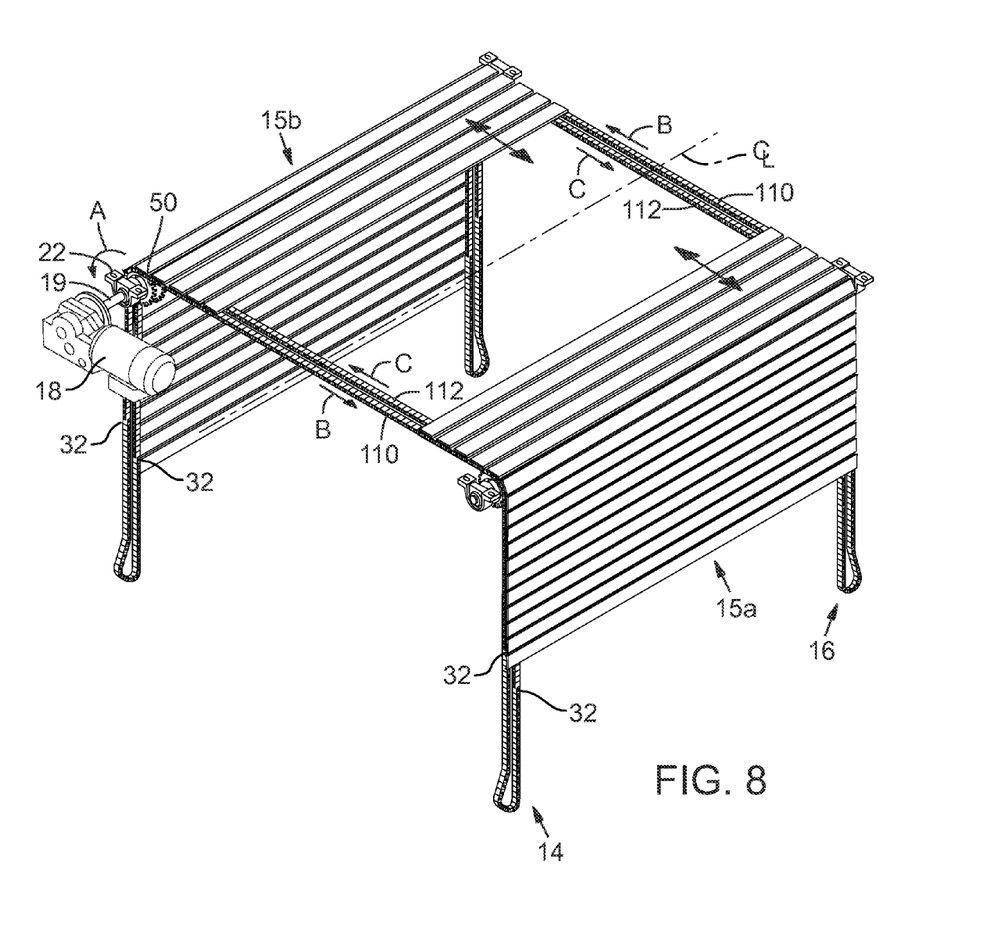
FIG. 8 is an upper perspective view of the bi-parting slatted floor in a partly opened position and illustrating the chain paths. As shown, each chain on a side of the floor is a single continuous length of chain.
Figure 9:
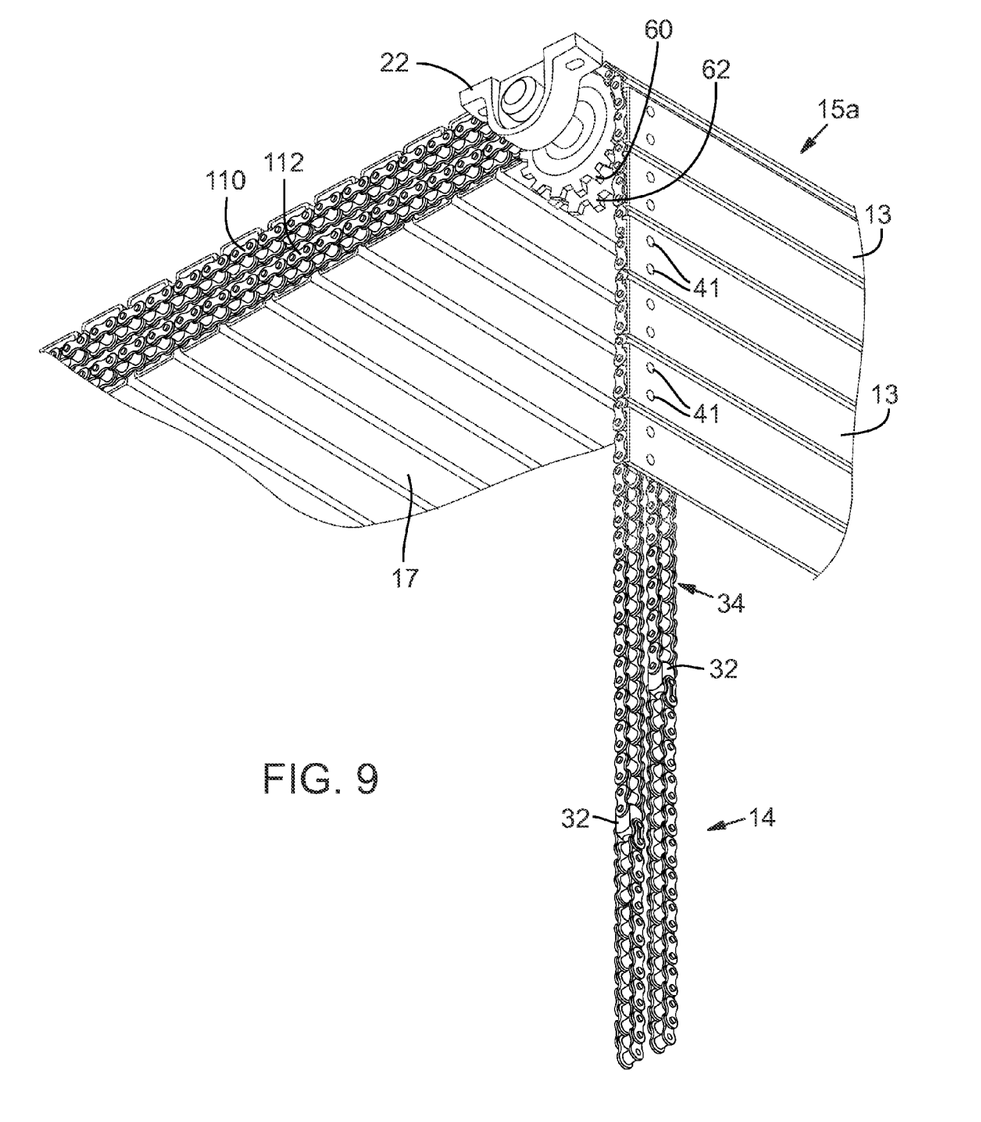
FIG. 9 is a bottom side perspective view of the chain drive system according to the present invention in which the bi-parted floor is shown in a partly open condition and illustrating the side-by-side chain arrangement.

Each of the single continuous lengths of chain 34 that define the first and second chain paths 14 and 16 are in the form of a loop. As shown in many of the figures but well-illustrated in FIG. 4, the chain 34 where it extends between driven shaft 20 and idler shaft 21 is oriented such that one side of the chain loop is immediately parallel to the other side of the chain loop and in the same plane. In this portion of the chain paths 14 and 16, the outermost length of chain is identified with reference number 110 and the innermost length of chain is identified with reference number 112. It will be appreciated that in order to have the length of chain 34 in a single loop with the sections of chain 110 and 112 side-by-side with one another as shown in the drawings, it is necessary to laterally shift the chain along its longitudinal axis. In other words, since chain cannot readily be bent, in order to arrange the chain so that portions of the same loop of chain are oriented side-by-side, it is necessary to shift the lateral chain spacing. This lateral shifting is accomplished with 90 degree chain couplers 32 as described above. Four 90 degree chain couplers 32 used in each of the two chain sections 14 and 16. With reference to FIG. 8, chain section 14 incorporates four separate 90 degree chain couplers 32, two at each end of the chain loops as shown on opposite sides of the bottom idler blocks 24. This allows the chain 34 to be laterally shifted along its length—the bottom deflector sprockets 82 move the chain laterally so that the sections 110 and 112 are arranged side-by-side relative to one another. Stated another way, if a chain section 110 defines a longitudinal axis or chain path that extends along the run of chain between the driven shaft 20 and the idler shaft 21, then the 90 degree chain couplers facilitate a lateral shift in the axis of the chain section 112 such that the two sections of the same chain may be side-by-side with the longitudinal axis or chain path defined by the chain section 112, the chain paths being parallel to one another, side-by-side and in a common plane.

Importantly, this results in the portions of the chain that attach to the lower surface 17 of the slatted floor 12—i.e., to sections 15a and 15b, sections 110 and 112—being parallel to one another and in the same horizontal plane. This orientation of the chains in the same horizontal plane is shown throughout the figures.

Figure 5A:
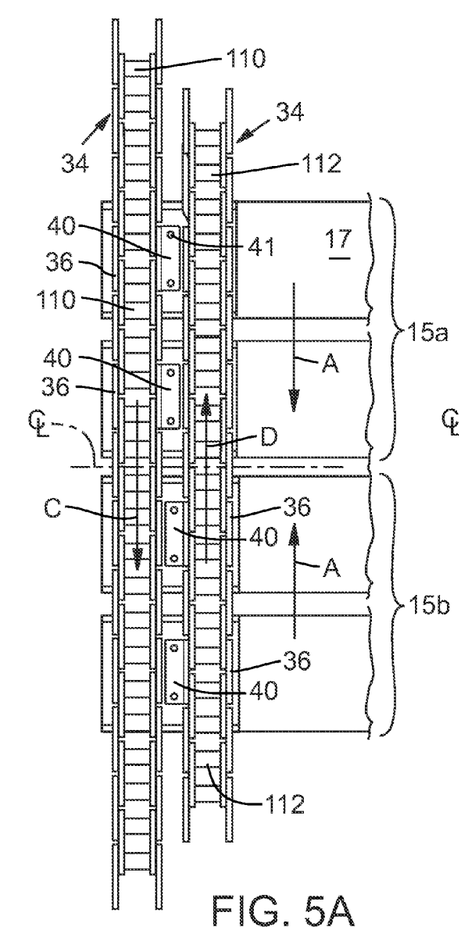
FIG. 5A is a plan view of a portion of the lower side of the slatted floor showing details of the one pair of the two pairs of side-by-side chains and illustrating the relative positions and directional movement of the chains when the slatted floor is moving from the open toward the closed position. The centerline between the two floor sections is illustrated with the dashed line.
Figure 5B:
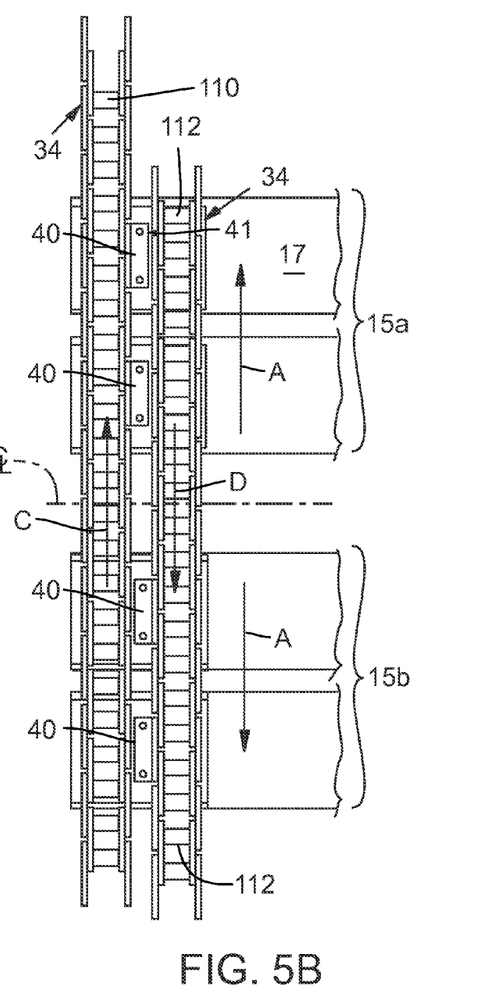
FIG. 5B is a plan view of a portion of the lower side of the slatted floor showing details of the one pair of the two pairs of side-by-side chains and illustrating the relative positions and directional movement of the chains when the slatted floor is moving from the closed toward the open position. The centerline between the two floor sections is illustrated with the dashed line.
Figure 7:
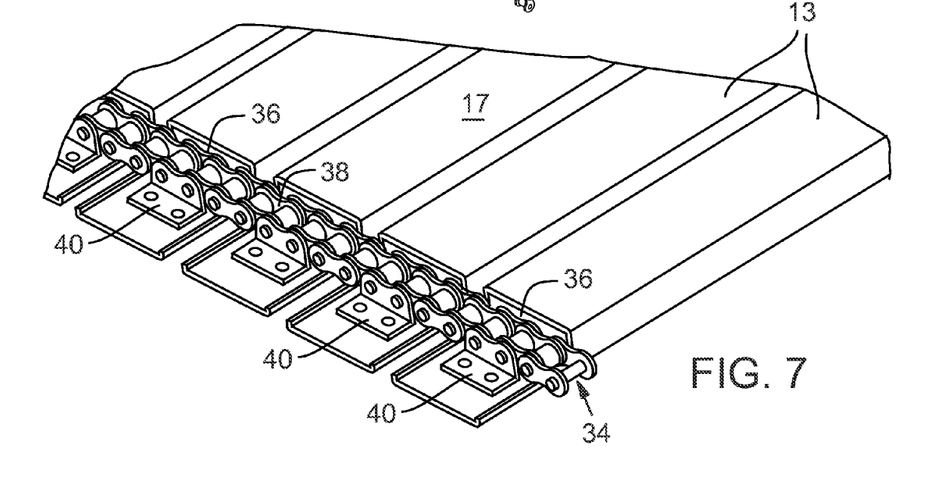
FIG. 7 is a close up detail view illustrating the lower side of several slats that comprise the slatted floor and one of the two sections of chains to illustrate the means of attaching the links of one chain to the slats.

With reference now to FIGS. 5A and 5B, the two parallel sections of chain 34 attach to opposite sections of the slatted floor 12 so that as the chain moves—driven by motor 18—the floor sections 15a and 15b move in opposite directions between the open and closed positions. In FIG. 5A the arrows A indicate that the floor sections 15a and 15b are moving toward one another—that is, they are moving to the closed position. The mid-line or center line between the two floor sections is labeled $C_L$. The outermost section of chain 34 is labeled with reference number 110 and the adjacent and innermost section of chain 34 is labeled with reference number 112. Chain section 110 includes two coupler links 36 that have arms 40 that are attached to the lower surface 17 of floor section 15a with appropriate fasteners such as rivets 41. Chain section 112 likewise has two coupler links 36 that have arms 40 that are attached to the lower surface 17 of floor section 15b. As illustrated in FIG. 7, which omits outermost section of chain 110 for clarity, each slat 13 has an end portion cut out to accommodate the chain. This allows both of the two parallel chain sections 110 and 112 to be located within the depth of the slats themselves, as illustrated. Since the chain sections are in the same horizontal plane, an underlying pallet onto which items will be deposited may be moved in very close proximity to the lower surface 17 of the slatted floor 12. In other words, the chain links are actually attached to the uppermost portion of each slat, thereby providing more vertical movement room for the underlying surface in the finished assembly—the underlying surface being the pallet or like structure onto which items are deposited.

As the motor 18 is operated to drive the floor sections 15a and 15b from the open toward the closed position, chain section 110 is moved in the direction of arrow C and chain section 112 is moved in the direction of arrow D. This causes the floor sections 15a and 15b to move toward one another in the respective directions of arrow A until they meet at center line $C_L$.

Movement of the floor sections 15a and 15b toward the open position from the closed position is shown in FIG. 5B. As the motor 18 is operated to drive the floor sections 15a and 15b from the closed toward the open position, chain section 110 is moved in the direction of arrow C and chain section 112 is moved in the direction of arrow D. This causes the floor sections 15a and 15b to separate from one another at center line $C_L$.

It will be appreciated that the view of FIGS. 5A and 5B is only a partial view and that there are plural additional coupler links 36 and associated arms 40 that attach to the respective sections of the floor 15a and 15b.

Operation of the chain drive system 10 according to the present invention will now be described with particular reference to FIG. 8, where the notation $C_L$ denotes the center line between floor sections 15a and 15b where the floor sections meet when the floor 12 is in the closed position. The operation of the chain drive system 10 moving from the closed to the open position will be described first. In the view of FIG. 8, motor 18 is operated so that drive shaft 19 rotates in the direction of arrow A. That is, counterclockwise in the view of FIG. 8. As the drive shaft 19 rotates, driven shaft 21 (not visible in FIG. 8) rotates in the same rotational direction, as do drive sprockets 50 and 56 (not visible in FIG. 8). This causes the outermost sections of chain—section 110 in chain path 14 and section 110 in chain section 16—to move in the direction of arrow B. Simultaneously, the innermost sections of chain—sections 112 in both chain paths 14 and 16—which as noted are parallel to the outer chain sections 110 and in the same plane therewith, to move in the direction of arrow C. Floor section 15a is attached to chain section 112. Floor section 15b is attached to chain section 110. As such, the slatted floor 12 is moved toward the open position. It will be appreciated that the slats 13 that define the slatted floor 12 facilitate transition of the floor sections from horizontal to vertical as the slats roll over the respective sprockets on driven shaft 20 and idler shaft 21. This allows for a small footprint for the overall apparatus.

When the rotational direction of motor 18 is reversed—that is, so that the motor is turning drive shaft 19 in the direction opposite arrow A in FIG. 8 (i.e., clockwise), floor sections 15a and 15b are moved from the open position toward the closed position and the operations described above are essentially reversed. Thus, the outermost sections of chain—section 110 in chain path 14 and section 110 in chain section 16—are pulled in the direction of arrow C and the innermost sections of chain—sections 112 in both chain paths 14 and 16—are simultaneously pulled in the direction of arrow B, moving the slatted floor 12 to the closed position. The motor 18 is operated under the control of a microprocessor and its operational duration is timed so that operation of the motor stops when the floor sections meet at the center line $C_L$.

It will be appreciated that certain variations to the structures and operations described above may be made to build equivalent embodiments. For example, it is possible to fix two of the idler sprockets on idler shaft 21 so that they are keyed to the idler shaft—the essentially become drive sprockets. Thus, with reference to FIGS. 1 and 4, the two outboard idler sprockets 60 and 66 could be fixed to idler shaft 21 without affecting operation of the apparatus 10. Other equivalent modifications will be evident to those of skill in the art.

Other alternatives include replacing the slats 13 with rollers that have end adaptations to attach the rollers to the chain. In other embodiments, the same side-by-side chain arrangement may be utilized with a bi-parting floor that utilizes two solid plates. In that case, the floor would not wrap from horizontal to vertical and the chains would be required to attach to the plates near the center line. Finally, the chain 34 may be replaced with wire rope or cable and the same benefit of vertical proximity between the underlying pallet and the lower surface of the bi-parting floor could be retained. In that case, because cable is relatively more flexible than chain, the cable could be oriented side-by-side between the driven shaft and the idler shaft without using 90 degree transition couplers such as those described above. Those of skill in the art will therefore recognize that while the preferred embodiments of the present invention are described and illustrated with a chain, the word chain is used somewhat generically where the context is appropriate to describe a material that is suitable for attachment to the floor components and for moving those components of the apparatus.

While the present invention has been described in terms of preferred and illustrated embodiments, it will be appreciated by those of ordinary skill that the spirit and scope of the invention is not limited to those embodiments, but extend to the various modifications and equivalents as defined in the appended claims.

The invention claimed is:

1. A chain drive for a bi-parting slatted floor, the bi-parting slatted floor having a first floor section and a second floor section and movable from a first position in which the first and second floor sections define a closed floor and a second position in which the first floor section is spaced apart from the second floor section to define an opening therebetween, comprising:
    a first continuous chain attached to the first and second floor sections;
    a second continuous chain attached to the first and second floor sections;
    wherein both of the first and second continuous chains separately define a first chain path and a second chain path where the first and second continuous chains extend across the opening defined when the first and second floor sections are in the second position, and wherein each of the first and second chain paths are parallel, side-by-side and in a common plane.

2. The chain drive according to claim 1 in which the first and second continuous chains define a loop in which the first chain path is laterally shifted relative the second chain path.

3. The chain drive according to claim 2 wherein when the slatted floor moves from the first position to the second position, the chain in the first chain path moves in a first direction and the chain in the second chain path moves in an opposite direction.

4. The chain drive according to claim 3 further including a driven shaft and an idler shaft, wherein each of the first and second continuous chains extend over the driven shaft and the idler shaft and the opening is between the driven shaft and the idler shaft.

5. The chain drive according to claim 4 including a single motor connected to the driven shaft for axial rotation thereof, and wherein axial rotation of the driven shaft causes simultaneous movement of the first and second continuous chains.

6. The chain drive according to claim 1 wherein each of the first and second continuous chains further comprise chain sections that are oriented at 90 degrees relative to adjacent chain sections.

7. The chain drive according to claim 1 wherein the first continuous chain is attached to a lower surface of the first and second floor sections and the second continuous chain is attached to a lower surface of the first and second floor sections.

8. The chain drive according to claim 7 wherein as the first floor section moves from the first position to the second position, the first and second continuous chains in the first and second chain paths move in opposite directions.

9. The chain drive according to claim 8 wherein the driven shaft includes a first driven sprocket and a first idler sprocket on a proximate end thereof, and a second driven sprocket and a second idler sprocket on a distal end thereof, and wherein the first continuous chain is engaged by the first driven sprocket and the first idler sprocket and the second continuous chain is engaged by the second driven sprocket and the second idler sprocket.

10. The chain drive according to claim 9 wherein the idler shaft includes a proximate first and second sprockets on a proximate end thereof, and a distal first and second sprockets on a distal end thereof, and wherein the first continuous chain is engaged by the proximate first and second sprockets the second continuous chain is engaged by distal first and second sprockets.

11. The chain drive according to claim 10 wherein the sprockets on the idler shaft are idler sprockets.

12. The chain drive according to claim 10 wherein at least two of the sprockets on the idler shaft are fixed to the shaft and rotate directly with said shaft.

13. The chain drive according to claim 1 including wherein each of the first and second continuous chains includes a tensioner.

14. A chain drive for a bi-parting slatted floor, the bi-parting slatted floor having a first floor section and a second floor section and movable from a first position in which the first and second floor sections define a closed floor and a second position in which the first floor section is spaced apart from the second floor section to define an opening therebetween, comprising:
a first continuous length of chain having a first chain section connected to the first floor section and a second chain section connected to the second floor section, the first chain section driven in the opposite direction from the second chain section as the floor moves between the closed and open positions, and wherein at least a portion of the first chain section is oriented side-by-side with and in the same plane as a portion of the second chain section.

15. The chain drive according to claim 14 including a second continuous length of chain having a first chain section connected to the first floor section and a second chain section connected to the second floor section, the first chain section of the second continuous length of chain driven in the opposite direction from the second chain section of the second continuous length of chain as the floor moves between the closed and open positions, and wherein at least a portion of the first chain section and a portion of the second chain section of the second continuous length of chain are oriented side-by-side and in the same plane.

16. The chain drive according to claim 15 including a drive shaft and an idler shaft spaced apart from said drive shaft, the spaced between said drive shaft and said idler shaft defining an opening.

17. The chain drive according to claim 16 wherein the first chain section of the first continuous length of chain defines a first longitudinal axis and wherein the second chain section of the first continuous length of chain defines a second longitudinal axis that is parallel to and spaced apart from said first longitudinal axis.

18. The chain drive according to claim 17 wherein the first chain section of the second continuous length of chain defines a first longitudinal axis and wherein the second chain section of the second continuous length of chain defines a second longitudinal axis that is parallel to and spaced apart from said first longitudinal axis.

19. The chain drive according to claim 18 including a single motor that drives both the first and second continuous lengths of chain.

20. A chain drive for a bi-parting slatted floor, the bi-parting slatted floor having a first floor section and a second floor section and movable from a first position in which the first and second floor sections define a closed floor and a second position in which the first floor section is spaced apart from the second floor section to define an opening therebetween, comprising:
a first continuous length of chain having a first chain section connected to the first floor section and a second chain section connected to the second floor section, wherein at least a portion of the first chain section of said first continuous length of chain is oriented side-by-side with and in the same plane as a portion of the second chain section of said first continuous length of chain; and
a second continuous length of chain having a first chain section connected to the first floor section and a second chain section connected to the second floor section, wherein at least a portion of the first chain section of said second continuous length of chain is oriented side-by-side with and in the same plane as a portion of the second chain section of said second continuous length of chain.

* * * * *